(No Model.) 7 Sheets—Sheet 1.

M. J. STEFFENS.
AUTOMATIC PHOTOGRAPHIC APPARATUS.

No. 429,705. Patented June 10, 1890.

(No Model.) 7 Sheets—Sheet 2.
M. J. STEFFENS.
AUTOMATIC PHOTOGRAPHIC APPARATUS.

No. 429,705. Patented June 10, 1890.

Witnesses:
Harry F. Jones
Frank E. Johnson

Inventor:
Mathew J. Steffens

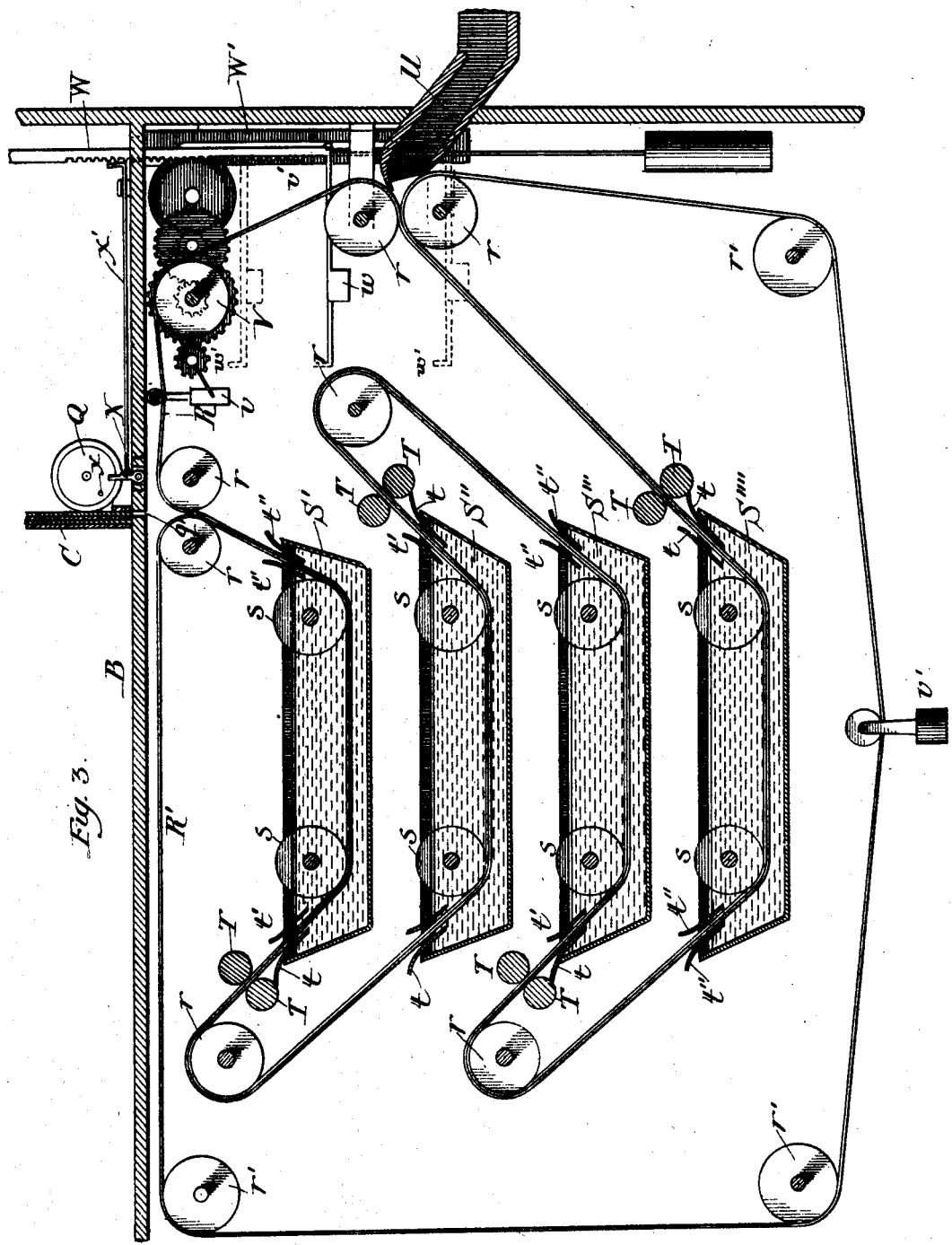

(No Model.) 7 Sheets—Sheet 4.
M. J. STEFFENS.
AUTOMATIC PHOTOGRAPHIC APPARATUS.
No. 429,705. Patented June 10, 1890.
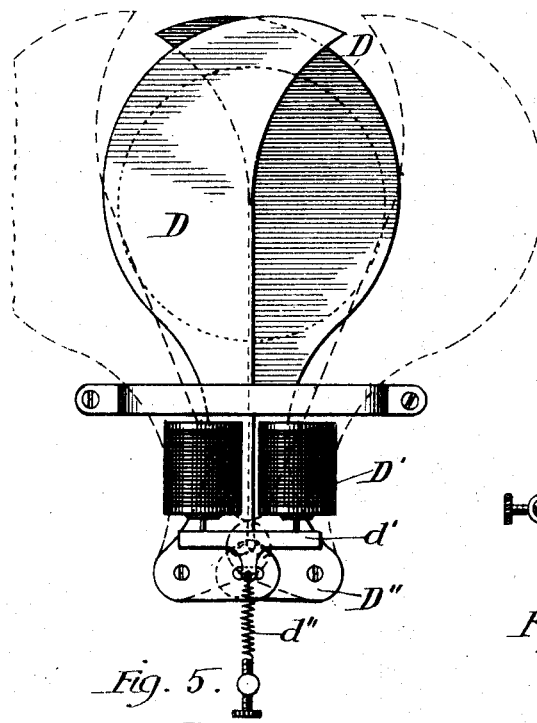
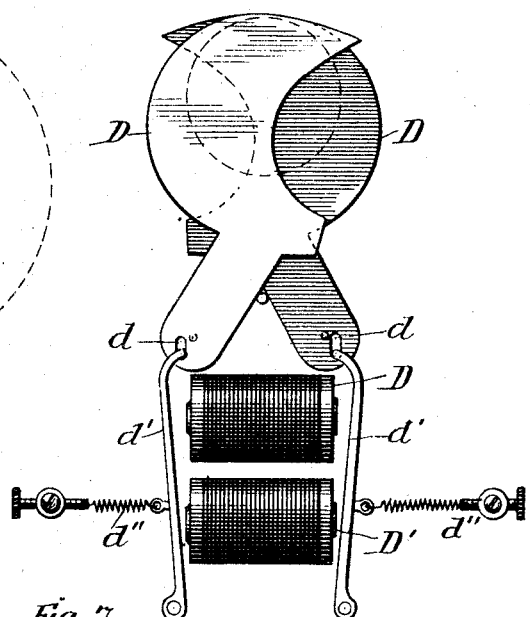
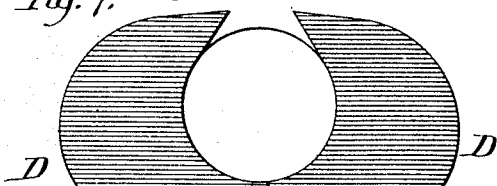
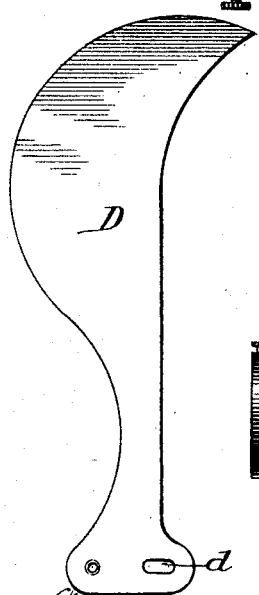
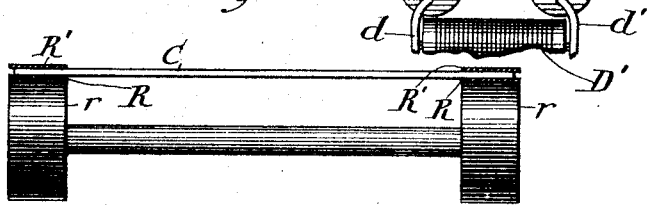
Witnesses:
Harry F. Jones
Frank E. Johnson
Inventor:
Mathew J. Steffens (No Model.) 7 Sheets—Sheet 5.
M. J. STEFFENS.
AUTOMATIC PHOTOGRAPHIC APPARATUS.
No. 429,705. Patented June 10, 1890.
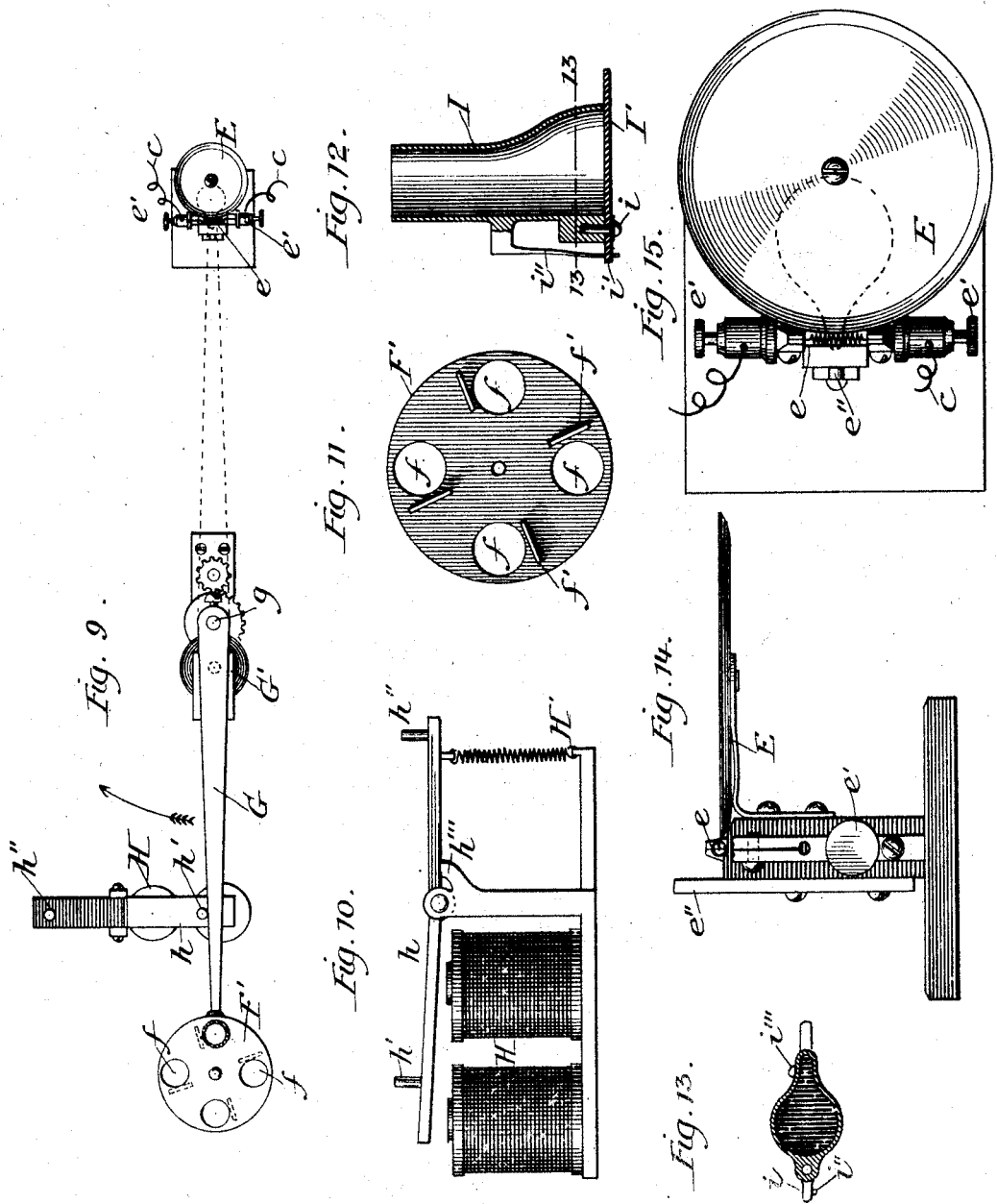

(No Model.) 7 Sheets—Sheet 6.
M. J. STEFFENS.
AUTOMATIC PHOTOGRAPHIC APPARATUS.
No. 429,705. Patented June 10, 1890.
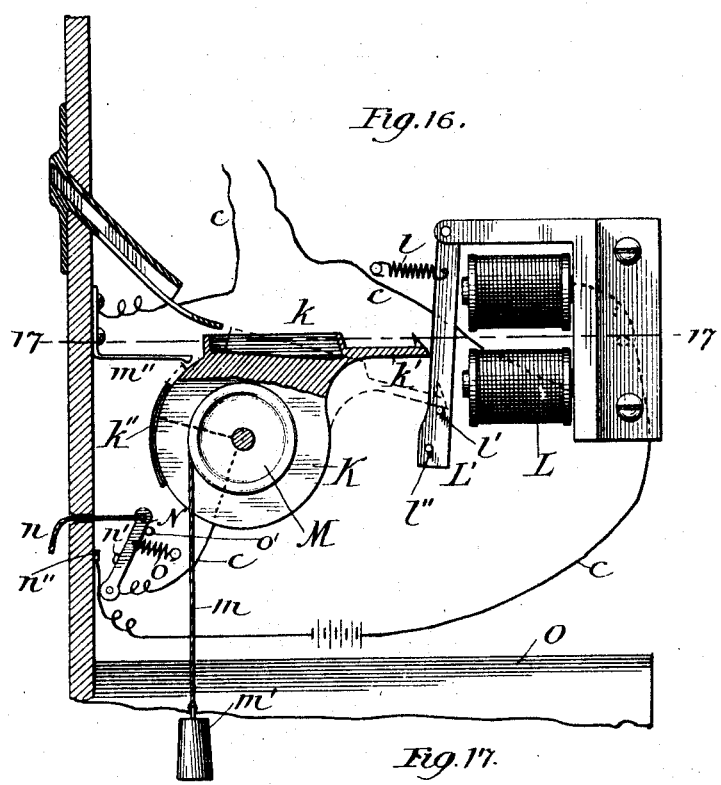
Fig. 16.
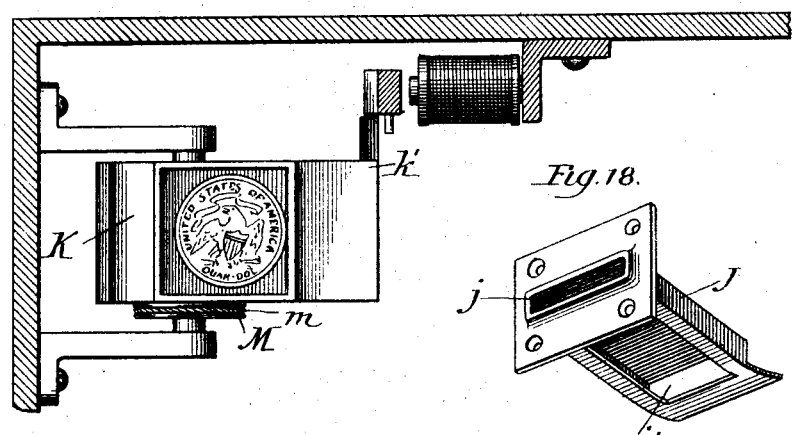
Fig. 17.
Fig. 18.
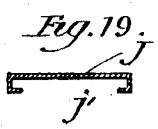
Fig. 19.
Witnesses:
Harry F. Jones
Frank E. Johnson
Inventor:
Mathew J. Steffens (No Model.) M. J. STEFFENS. 7 Sheets—Sheet 7.
AUTOMATIC PHOTOGRAPHIC APPARATUS.
No. 429,705. Patented June 10, 1890.

Witnesses:
Harry F. Jones
Frank E. Johnson

Inventor:
Mathew J. Steffens

UNITED STATES PATENT OFFICE.

MATHEW JOSEPH STEFFENS, OF CHICAGO, ILLINOIS.

AUTOMATIC PHOTOGRAPHIC APPARATUS.

SPECIFICATION forming part of Letters Patent No. 429,705, dated June 10, 1890.

Application filed May 31, 1889. Serial No. 312,685. (No model.)

*To all whom it may concern:*

Be it known that I, MATHEW JOSEPH STEFFENS, residing at Chicago, in the county of Cook and State of Illinois, and a citizen of the United States, have invented a new and useful Automatic Photographic Apparatus, of which the following is a specification, reference being had to the accompanying drawings, in which—

Figure 1:
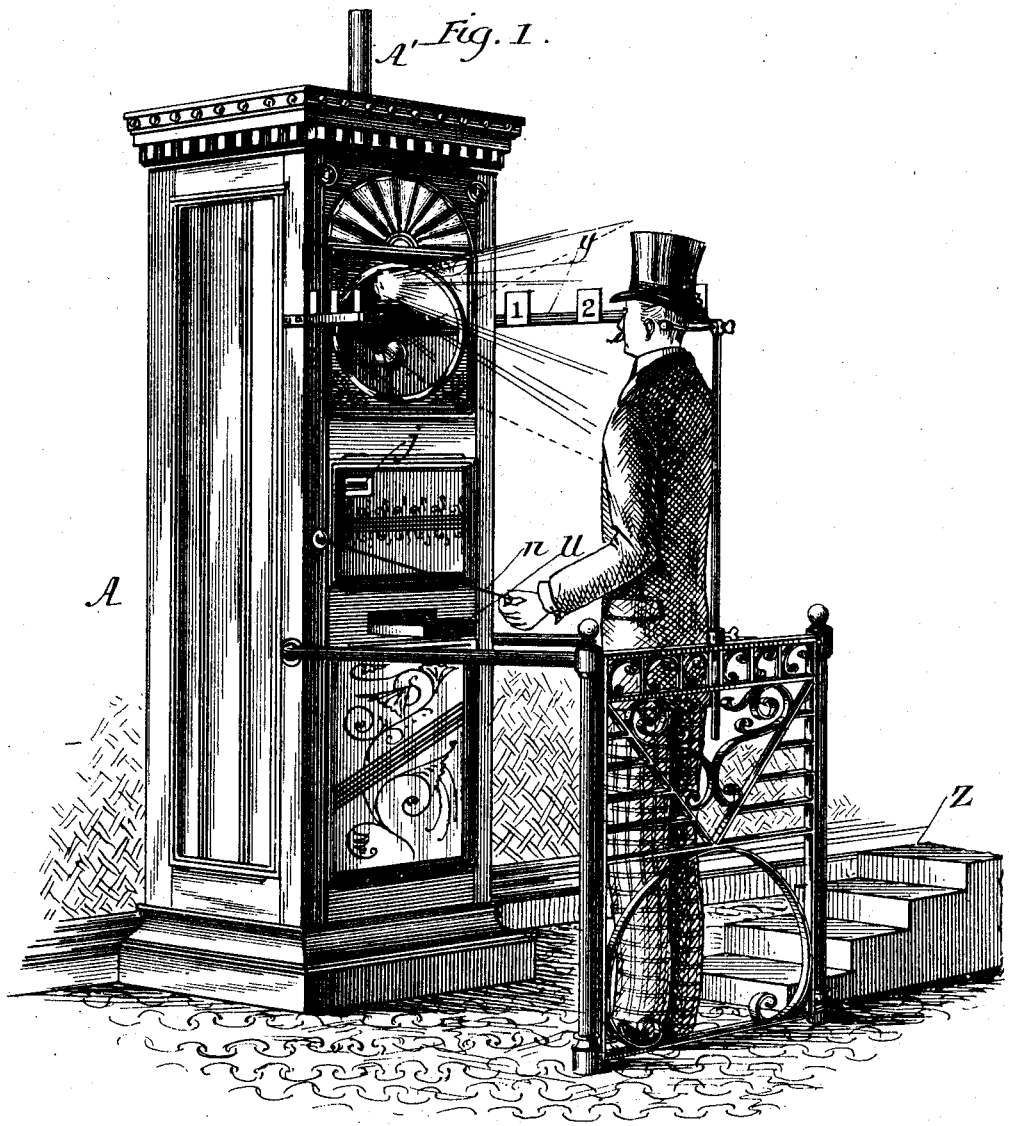
Figure 2:
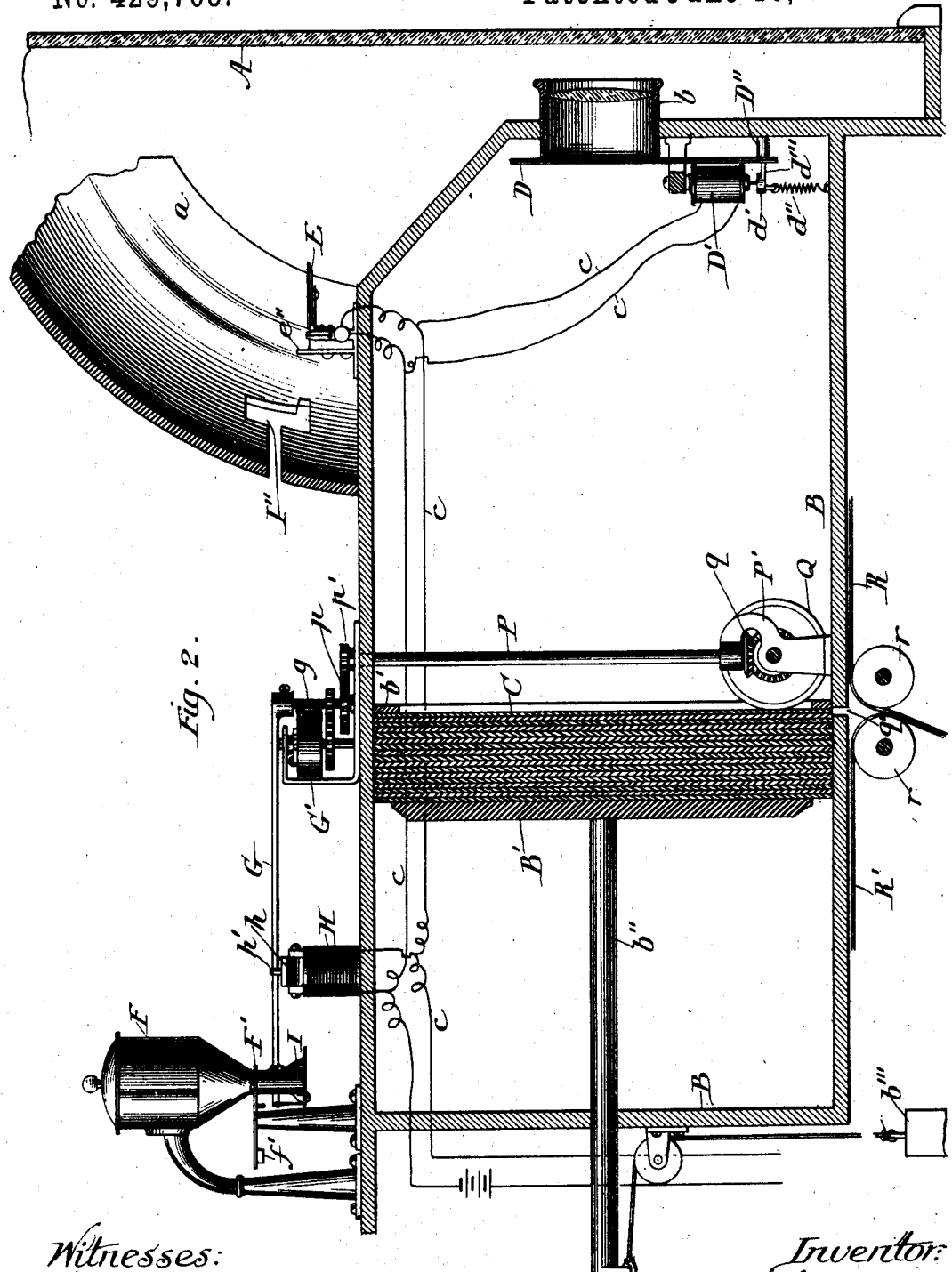
Figure 20:
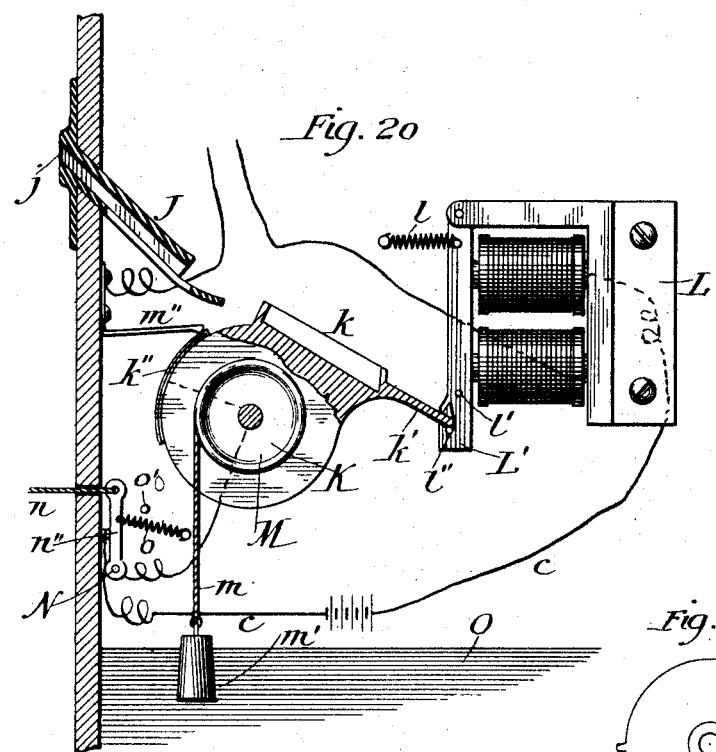
Figure 22:
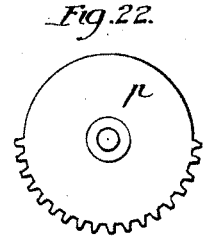
Figure 21:
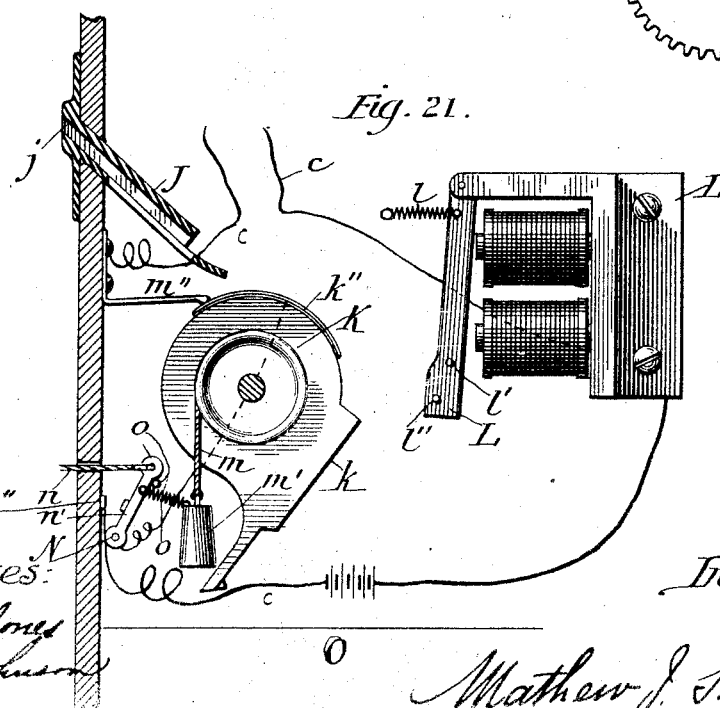

Figure 1 is a reduced perspective view. Fig. 2 is a vertical section through the camera, showing some of the parts in elevation. Fig. 3 is a vertical section through the developing and fixing apparatus. Fig. 4 is an enlarged detail showing one form of shutter for the lens and its operating mechanism. Fig. 5 is an enlarged detail showing one section of the shutter shown in Fig. 4. Fig. 6 is an enlarged detail showing another form of shutter for the lens and its operating mechanism. Fig. 7 is an enlarged detail showing the shutters of the form shown in Fig. 6 open. Fig. 8 is a detail showing a plate passing over one of the rollers. Fig. 9 is a detail, being a top or plan view of the mechanism for charging the flash-pan. Fig. 10 is an enlarged detail, being a side elevation of the electro-magnet and its armature for controlling the mechanism for charging the flash-pan. Fig. 11 is an enlarged detail, being a bottom view of the rotating disk for closing the opening in the flash-powder magazine. Fig. 12 is an enlarged detail, being a vertical section through the cup which conveys the flash-powder from the magazine to the flash-pan. Fig. 13 is an enlarged detail, being a horizontal section at line 13 13 of Fig. 12. Fig. 14 is an enlarged detail, being a side elevation of the flash-pan. Fig. 15 is an enlarged detail, being a top view of the flash-pan. Fig. 16 is a vertical section, some parts being in elevation through the coin-controlling apparatus. Fig. 17 is a horizontal section at line 17 17 of Fig. 16. Fig. 18 is a detail, being a perspective view of the coin-channel. Fig. 19 is a detail, being a cross-section through the coin-channel. Fig. 20 is a detail, being a view similar to Fig. 16, showing the circuit closed. Fig. 21 is a detail, being a view similar to Fig. 16, showing the coin deposited. Fig. 22 is a detail showing a half gear-wheel for driving the mechanism for removing a plate from the holder.

The object of this invention is to construct an automatic photographing apparatus which may be controlled by a coin, which I accomplish as illustrated in the drawings and as hereinafter described.

That which I claim as new will be pointed out in the claims.

In the drawings, A represents the case which contains the apparatus. The form and size of this case may be varied to suit the arrangement of the several parts of the apparatus.

B represents the camera. This camera is provided with the usual portrait-lens $b$, as shown in Figs. 1 and 2. At the focal distance from the lens $b$ in the camera B is located a rectangular frame $b'$, against which a sensitized plate C is to be pressed. A number of sensitized plates C are placed in the chamber back of the frame $b'$, each with its sensitized surface toward the lens $b$. The plates C are pressed forward against the frame $b'$ by a plate B'. This plate B' has a stem $b''$, which projects through the rear wall of the plate-chamber, and a weight $b'''$ acts to press the stem $b''$ and plate B' forward. The plates C can be made of black celluloid or any other suitable material which is slightly flexible and coated either with collodion or gelatine and sensitized, as usual. The plates C may be inserted between the frame $b'$ and the plate B' in the chamber through a door to be provided in the camera for that purpose.

D is the shutter for the lens $b$. This shutter, as shown in Figs. 4 and 6, consists of two sections pivoted at their lower ends on a bracket D''.

D' is an electro-magnet located below the lens $b$ and secured to the bracket D''. As shown in Figs. 2 and 4, the armature $d'$ of this electro-magnet is provided with two pins $d'''$, one of which projects into each of the slots $d$ in the two sections which form the shutter D. The armature is held out of contact with the electro-magnet by a spring $d''$, which also holds the shutters D closed. Whenever a circuit is complete through the wire $c$ and the electro-magnet D', the armature $d'$ is drawn upward, which, through the pins $d'''$ and slots $d$, opens the shutters D. The opening of the circuit will allow the spring $d''$ to close the shutters D.

As shown in Figs. 6 and 7, two armatures are provided for the electro-magnet, each armature being connected with one of the sections of the shutter D, and each being held out of contact by a spring $d''$.

E is a flash-pan. This flash-pan, as shown in Figs. 9, 14, and 15, is provided near its inner edge with a fine platinum wire $e$, which is held at each end by a binding-post $e'$, to which the circuit-wire $c$ is connected. This flash-pan, as shown in Fig. 2, is located a short distance above and back of the lens $b$ in front of a reflector $a$.

F is a magazine, in which is stored the actinic powder used to produce the flash-light. This magazine, as shown in Fig. 2, is located at a distance from the flash-pan E, so that its powder will not be ignited by the ignition of the powder placed on the flash-pan. Under an opening in the lower end of the magazine F is supported a rotating plate $F'$, as shown in Fig. 2. This rotating plate $F'$, as shown in Figs. 9 and 11, is provided with a number of holes $f$, which correspond in form and size to the opening in the lower end of the magazine F, and it is also provided with a depending flange $f'$ between each of the holes, for the purpose hereinafter described.

G is an arm, which at one end is pivoted on a vertical axle $g$, as shown in Figs. 2 and 9.

$G'$ is a motor or driving mechanism connected with the axle $g$ to rotate it and the arm G in the direction indicated by the arrow in Fig. 9.

H is an electro-magnet located near the magazine F below the plane of the arm G. The armature $h$ of this electro-magnet H is pivoted near its center and is provided with a pin $h'$, as shown in Figs. 2 and 9, on its end over the electro-magnet and a pin $h''$ on its opposite end. A spring $H'$ tends to hold the armature out of contact with the electro-magnet, while a stop $h'''$ prevents it from raising the inner end of the armature $h$ too high.

I is a cup secured on the outer end of the arm G. This cup has an opening at its top corresponding in size and form to the openings $f$ in the disk F. Its bottom, as shown in Fig. 12, is pivoted at its inner edge on a pivot $i$ and is provided with a projection $i'$, against which a spring $i''$ presses to hold the bottom closed. When the arm G is in the position shown in Figs. 2 and 9, its motor $G'$ presses it against the pin $h'$ on the armature $h$ over the electro-magnet H and the top of the cup I. One of the holes $f$ in the rotating plate $F'$ and the opening in the bottom of the magazine F are in line, in which position the cup I will be filled with powder from the magazine. When the circuit through the wire $c$ and electro-magnet H is closed, the end of the armature $h$ will be drawn down, allowing the arm G to pass over the pin $h'$ and raising the pin $h''$, which will stop the movement of the arm G until the circuit is opened, allowing the spring $H'$ to draw the outer end of the armature $h$ downward, which will allow the arm G to rotate around to the flash-pan E.

When the cup I passes from under the magazine F, it will strike one of the depending flanges $f'$ on the rotating plate $F'$, moving it far enough to close the opening in the bottom of the magazine F. When the cup I comes over the flash-pan, as indicated in dotted lines in Fig. 9, a projection $e''$ on or near the flash-pan E will engage with the projection $i'$ on the bottom I', causing it to swing open and allowing the flash-powder to be deposited on the pan E. When the cup I has passed the pan E and projection $e''$, the spring $i''$ will close the bottom, the stop $i'''$ preventing it from moving too far. When the arm G and cup I swing around to the position shown in Fig. 2, the top of the cup I will engage with one of the depending flanges $f'$, rotating the plate $F'$ until it and the arm G are stopped under the magazine F by the pin $h'$ in the position first described. An opening $I''$ is made in the reflector $a$ in the case A to permit the cup I and outer end of the arm G to swing through it in order to deposit the flash-powder on the pan E. The cup I is made in the form shown in section in Fig. 13 in order to deposit the major portion of the powder near the center of the pan E and a small amount on or near the wire $e$, as indicated in dotted lines in Fig. 15, so that the ignition of the powder will have the least effect possible on the wire $e$. A chimney $A'$ is provided, through which the smoke will pass upward, so that the smoke and fumes of the flash-powder will not be thrown outward against the person using the apparatus.

J is a coin-channel, which has an opening $j$ on the outside of the case, which is just long and wide enough to receive the coin which is to be the price of a single picture, which in this instance is a quarter of a dollar. The lower side of the channel J, as shown in Figs. 16 and 18, is cut out, so that any other coin or object than a quarter of a dollar will fall through to the receptacle below.

K is a wheel mounted on a horizontal axle located below the lower end of the channel J. This wheel K is made of wood, hard rubber, or other similar material. It is provided with a receptacle or tray $k$, to receive the coin from the channel J, and with an arm $k'$, having a pin or stud on one side, as shown in Figs. 16, 17, and 20.

L is an electro-magnet, and $L'$ is its armature, which is pivoted at one end, and is provided at its free end with two pins $l'$ $l''$, which are situated a short distance apart, as shown in Fig. 16. A spring $l$ holds the armature $L'$ out of contact with the electro-magnet when the circuit is open, as shown in Fig. 16.

M is a band-wheel secured to or made with the wheel K. A band or cord $m$ is wound around the wheel M and one of its ends secured thereto. On the lower end of the band or cord $m$ is a weight $m'$ to return the wheel K to the position shown in Fig. 1 after the coin has been deposited.

$m''$ is an arm secured to the side of the chamber to which the circuit-wire c is connected, and k″ is a metal strip on the wheel K, to which the circuit-wire c is connected, so that when the arm m″ and strip k″ are in engagement, as indicated by dotted lines in Fig. 16 and shown in Fig. 20, the circuit will be closed through the arm m″ and strip k″. When the parts are in the position shown in Fig. 16, the circuit will be open.

N is a lever pivoted at one end, to which the circuit-wire c is connected. It is provided with a cord n, which extends through an opening in the case A, by which cord the lever N can be pulled forward, and also with a spring o, which will pull it back as soon as the cord n is released, a stop o′ being provided to prevent its being moved back too far. The lever N is also provided with a contact-point n′, which engages with a contact-point n″, to which the wire c is connected when the lever N is pulled forward by the cord n, as shown in Fig. 20, thereby closing the circuit through the contact-points n′ n″.

When a quarter of a dollar or other coin by which this apparatus is designed to be controlled is dropped into the slot j, it will pass downward in the channel J to the tray k on the wheel K, and its weight will cause the wheel K to rock to the position indicated by dotted lines in Fig. 16, when the pin on the arm k′ will engage with the first pin l′, and the arm m″ will engage with the metal strip k″, thereby closing the circuit at that point, the circuit still being open at the points n′ and n″. When the operator pulls on the cord n, bringing the lever N into the position shown in Fig. 20, the circuit, through the wire c and its several connections, will be closed, causing the different parts to operate as described hereinbefore. The pin on the arm k′ rests on the pin l′ on the armature L until the circuit is closed at N, when the armature L′ is drawn toward the magnet L, allowing the pin on the arm k′ to pass the pin l′ and engage with the pin l″ until the circuit is opened. When the cord n is released, the spring o will draw the lever N back, breaking the circuit at n′ n″, thus opening the circuit through the wire c. When the circuit is opened, the spring l will pull the armature L′ away from the electro-magnet L, which will allow the pin on the arm k′ to pass the pin l″ and descend to the position shown in Fig. 21, when the coin will fall out of the tray k and be deposited in the receptacle O. As soon as the coin drops from the tray k the weight m′ will rock the wheel K back to the position shown in Fig. 16, the pin on the arm k′ being beveled, as shown in Figs. 16 and 17, to allow it to pass the pins l′ and l″ on the armature L′.

The coin-controlled mechanism above described may be located in any convenient place in the case A.

I have shown and described a single circuit-wire c; but two or more independent circuits may be used to operate the magnets and the flash-pan independently; but in such case the circuits must be closed and opened simultaneously by double contact-points or other suitable means.

Any number of batteries or other electric generators may be used to operate the several devices, and such electric generators may be located in any suitable place in the case A.

I have shown a lever and pull-cord for closing and opening the circuit through the wire c; but it will be understood that a push-button or any other suitable device may be used for that purpose.

P (see Fig. 2) is a vertical shaft. It is provided at its upper end with a pinion p′, which meshes with a half gear-wheel p on the shaft g of the arm G and at its lower end is supported in a support P′.

Q indicates one or more wheels mounted on a horizontal axle, which are rotated by the vertical shaft P through the bevel-gear pinions q. After the exposure of the plate has been made and the circuit through the wire c is opened, the arm G swings from the magazine F to the flash-pan without rotating the shaft P, because the wheel p has no gear on one side. When the arm G swings from the pan E to the magazine F, the teeth on the wheel p will cause the pinion p′ and shaft P to rotate, rotating the wheel or wheels Q. The wheel or wheels Q bear against the plate C, which has been exposed, and when rotated will cause the plate to pass downward through a slot q′, which is wide enough to allow only one plate to pass down at a time. The pinion p′ and half gear-wheel p, pinions q, and wheel or wheels Q are of such relative size that the swinging of the arm G from the pan E to the magazine F will rotate the wheel or wheels Q once, which is sufficient to carry down one plate only.

R R′ are two tapes, made of rubber or other material which will not be affected by the developing-fluid or fixing-fluid and will not itself affect the fluids.

S′ is a pan containing any suitable developing-bath.

S″ is a pan containing water or other suitable liquid for washing the plate.

S‴ is a pan containing a fixing-bath.

S″″ is a pan containing a bath for removing the fixing composition, and may be of such a nature as to also act to dry the plate.

The plate C, after passing through the slot q′, passes between the rollers r, over which the tapes R R′ run, and is carried down into the developing-bath in the pan S′, the tapes passing under rollers s, which insure the plate being entirely covered with the developer. It then passes upward to and around a roller r and downward to and through the washing-fluid in the pan S″, then upward to and over a roller r and downward to and through a fixing-fluid in the pan S‴, then upward to and over a roller r and downward to and through a washing or washing and drying composition in the pan S″″, and then upward to and between rollers r, and is delivered to a channel U, which leads to the outside of the case A.

T T represent two rollers, between a pair of which the plate and tapes pass, after passing through each of the pans S' S'' S''' S'''', for squeezing off any of the fluid which may remain on the tapes and plate. Below each set of rollers T is placed a plate $t$, which extends down into the liquid in the pan to carry back whatever may be squeezed off from the tapes and plate into the pan.

In order to prevent the liquid in each of the pans from being affected by exposure to the atmosphere, I cover it with oil. To prevent the oil from coming in contact with the plates when the plate leaves each pan, a plate $t'$ is placed near the plate $t$, and extends down into the liquid, so that the plates $t\ t'$ form a chamber in which there is no oil on the surface of the liquid. A similar chamber is formed at the entrance end of each pan by two plates $t''$, which prevents the oil from coming in contact with the plate as it enters the pan. The tape R, and with it the tape R', is driven by a motor or driving-power V, which may be located in any convenient position. The tape R is kept taut by a weight or tightening-pulley, as $v$, and the tape R' is kept taut by a pulley or weight $v'$, as shown in Fig. 3.

W is a rack. This rack slides in vertical guides W' and engages with one of the wheels of the motor V. It is provided with an arm and weight $w$ at or near its lower end, which tends to hold the rack in engagement with the wheel of the motor, and is also provided with a tooth $w'$, which engages with the teeth of one of the wheels of the motor V when the rack is raised up by the rotation of the wheel, thereby stopping the motor. The motor will drive the tapes far enough to deliver a plate while the rack is being raised.

X is a lever pivoted in the camera B in such position as to be engaged by a pin $x$ on one of the wheels Q when it begins to rotate. Pivoted to this lever is a rod $x'$, whose end abuts against the rack W, so that when the pin $x$ engages with the lever X the rack W will be tilted backward out of engagement with the wheel of the motor and will descend to the position indicated in dotted lines in Fig. 3, thereby allowing the motor to run and drive the tape R, and with it the tape R'. The rotation of the wheel of the motor with which the rack W engages will raise the rack until its tooth $w'$ engages with the fly-wheel and stops its rotation. If a second plate is exposed and the wheel Q again rotated before the first plate has been delivered by the tapes, the rack W will be dropped to its lowest position, so that the last plate received by the tapes R R' will be delivered before the motor is stopped by the engagement of the teeth $w'$ with the wheel of the motor.

Y are two rods secured to the case A, one on each side, as shown in Fig. 1, on each of which is secured a number of objects, indicating the points at which the person whose photograph is being taken should look in order to secure a front, one-quarter, half, three-quarters, or profile view, and by looking on one or the other a view of either the right or left side may be taken.

Any suitable head-rest may be used, and any suitable means—such as a series of steps Z or a screw stool or chair—may be used to raise the person to the proper position. A suitable background may also be employed, none being shown, as it would obscure the view of the other parts.

I have hereinbefore described the operation of each part separately. The general operation of the apparatus is as follows: The person who desires to have his picture taken stands in front of the case A, directing his eyes to the point on the rod Y which will give him the view desired. When a quarter of a dollar or the coin by which this apparatus is designed to be controlled is dropped into the slot $j$, it will pass down through the channel J to the tray $k$ on the wheel K and cause the wheel K to rock to the position indicated by dotted lines in Fig. 16, closing the circuit by the engagement of the arm $m''$ with the strip $k''$ on the wheel K, the circuit still being open at the points $n'\ n''$. The operator must then pull on the cord $n$, which will then close the circuit through the wire $c$. The circuit being closed, the electro-magnet D' will open the shutter D, the electro-magnet H will allow the arm G to pass from the pin $h'$ to the pin $h''$, and the electro-magnet L will attract its armature L', allowing the arm $k'$ to descend to the second pin $l''$, as shown in Fig. 20. The current through the wire $c$ will cause the wire $e$ to become heated by the resistance at that point, igniting the flash-powder on the pan E; but the wire $e$ will not be heated sufficiently until about a quarter of a second after the electro-magnet D' has opened the shutter D. The ignition of the flash-powder on the pan E will cause a sufficient exposure of the plate C and will give an equal exposure to each plate. When the cord $n$ is released, the circuit will be opened at the points $n'\ n''$, and the electro-magnet D' will allow the shutter D to be closed by the spring $d''$. The electro-magnet L will allow the armature L' to be drawn back to allow the arm $k'$ to pass the pin $l''$ and deposit the coin in the receptacle and return to its normal position, the wire $e$ will quickly cool, and the electro-magnet H will allow the armature $h$ to be tilted by the spring H' to the position shown in Fig. 10, when the arm G will pass over the pin $h''$, swing around to the flash-pan E, deposit the load in the cup I, and return to the magazine F. The return of the arm G through the half-gear $p$ will rotate the shaft P and wheel or wheels Q, causing the plate C, which has been exposed, to pass downward through the slot $q'$ to and between the rollers $r$ and tapes R R'. The pin $x$ will strike the lever X when the wheel Q begins to move, releasing the rack W from the motor V, allowing the rack to drop. The tapes R R' will then carry the plate C through the developing-pan S', the washing-pan S'', the fixing-pan S''', and the washing or drying pan S'''' and deliver it to the channel U, through which it passes to the outside of the apparatus. The motor will be stopped by the tooth $w'$ when the rack W is raised, as already described. The speed of the motor V can be regulated to suit the time required to finish the plate C. The operator must release the cord $n$ before the circuit will be open to allow the arm G to swing and operate the finishing mechanism after the exposure, and the opening of the circuit at $n''$ will allow the wheel K to rock back to its normal position, so that another coin must be dropped into the slot $j$ before another picture can be obtained. The motors G' and V may be driven either by springs or weights, as shown, which can be wound up when new plates are placed in the plate-chamber, or any suitable electric motor may be employed, which can be set in operation as described above. A second load of flash-powder cannot be deposited on the flash-pan E until after the circuit has been closed and opened, so that more than one charge cannot be deposited on the flash-pan at one time.

From the above description of the apparatus, as illustrated in the drawings, I wish it to be understood that the same is only one of different mechanisms which I have contemplated and which may be effectually employed for carrying out the main feature of my invention, which is the production of a photograph by an automatic photographing apparatus which may be controlled by any predetermined weight, as a coin. Many of the mechanisms and means may be varied or other mechanisms or means substituted which will produce the same result. Thus a different light may be employed, and by some modifications sunlight, electric light, or calcium light may be found suitable. The mechanism for developing and fixing the plate may be greatly varied and other parts varied as hereinbefore suggested.

What I claim as new, and desire to secure by Letters Patent, is—

1. The combination, in an automatic photographic apparatus, of a camera, a shutter for the lens, means for producing an actinic light, and apparatus for removing and finishing the exposed plate, substantially as specified.

2. The combination, in an automatic photographic apparatus, of a camera, a shutter for the lens, mechanism for holding the plate in focus, mechanism for removing the plate after being exposed, means for holding and igniting a powder for producing an actinic light, and mechanism for supplying a charge of powder after each exposure, substantially as specified.

3. The combination, in an automatic photographic apparatus, of a camera, mechanism for exposing the plate, mechanism for removing and finishing the plate, means for producing an actinic light, and mechanism for controlling the operation of the apparatus by a predetermined weight, as a coin, substantially as specified.

4. In an automatic photographic apparatus, the combination, with a flash-pan and magazine containing actinic powder, of a rotating arm G, carrying a cup, and mechanism for rotating said arm after the ignition of each charge on the said flash-pan, substantially as and for the purpose specified.

5. In an automatic photographic apparatus, the combination, with a rotating arm for charging the flash-pan from a magazine, of an electro-magnet H and an armature $h$, having pins $h'$ and $h''$, for controlling the movements of the arm, substantially as specified.

6. In an automatic photographic apparatus, the combination, with a magazine F, a rotating arm G, mechanism for controlling the movements of said arm, and a cup on said arm, having a movable bottom, of a flash-pan E and a projection $e''$, whereby the charge is deposited at a predetermined point on said pan, substantially as and for the purpose specified.

7. In an automatic photographic apparatus, the combination, with the circuit wire or wires for controlling the mechanisms of said apparatus, of a wheel K, having a tray $k$, and electrical contact-points adapted to be brought into engagement by the rocking of said wheel, substantially as and for the purpose specified.

8. In an automatic photographic apparatus, the combination, with the circuit wire or wires $c$, wheel K, having an arm $k'$, and contact-points $k''$ and $m''$, of an electro-magnet L and armature L', having pins $l'$ and $l''$, substantially as specified.

9. In an automatic photographic apparatus, the combination, with a camera and mechanism for removing the plate from the camera, of carrying-tapes R R', and means for developing and fixing the image on the plate, and a motor for driving the tapes, substantially as and for the purpose set forth.

10. In an automatic photographic apparatus, the combination, with mechanism for exposing and finishing a photographic plate, of mechanism for controlling the operation of the apparatus by a weight, as a coin, and means, as at N, for opening and closing the circuit by which the apparatus is controlled, substantially as specified.

11. In an automatic photographic apparatus, the combination, with a pan, as S', having the protecting-chambers, of traveling tapes R R', substantially as and for the purpose specified.

MATHEW JOSEPH STEFFENS.

Witnesses:
ALBERT H. ADAMS,
HARRY T. JONES.